Feb. 10, 1953     D. R. MERTON ET AL     2,628,119
PAN AND POT LIFTER
Filed June 30, 1949
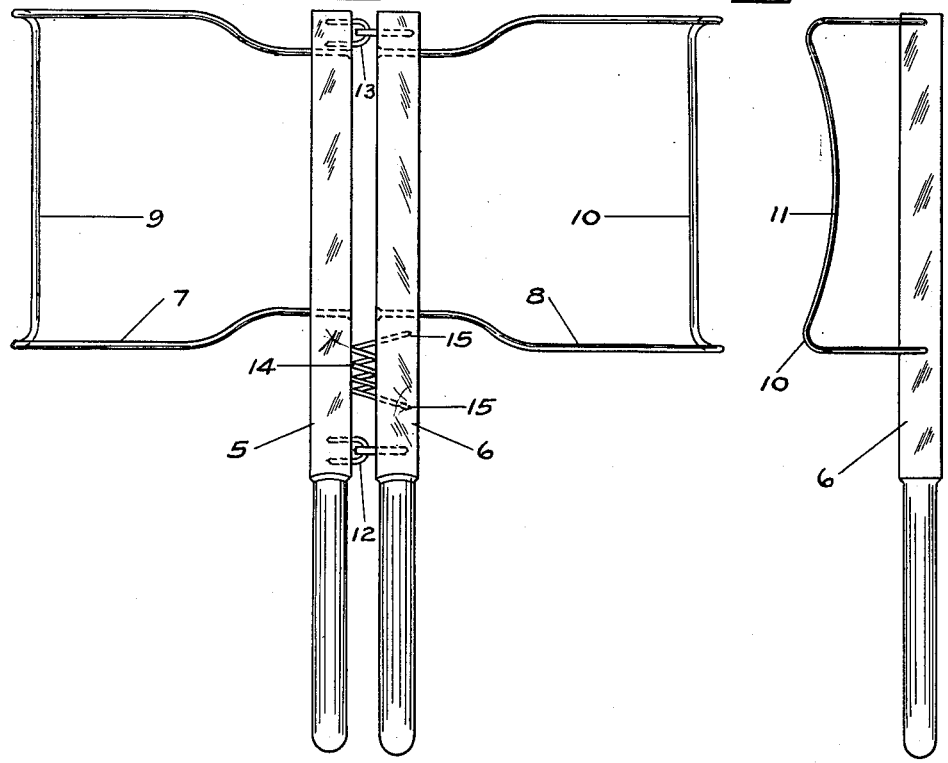
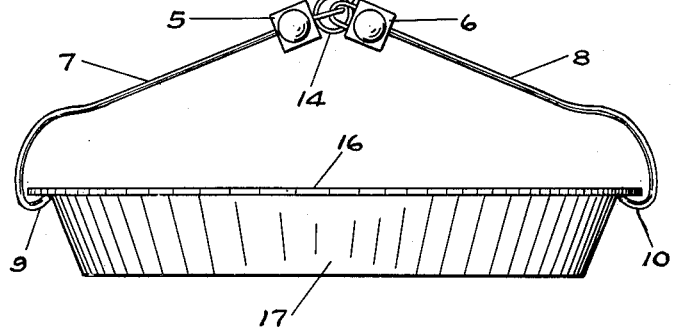
INVENTORS
DELMER R. MERTON
MARGUERITE MERTON
BY *Edward C Healy*
ATTORNEY Patented Feb. 10, 1953

2,628,119

UNITED STATES PATENT OFFICE 2,628,119

PAN AND POT LIFTER

Delmer R. Merton and Marguerite Merton, Oakland, Calif.

Application June 30, 1949, Serial No. 102,416

1 Claim. (Cl. 294—30)

This invention relates to improvements in pan and pot lifters and has for the primary object the provision of an improved device that will facilitate the lifting of pans and pots from cooking stoves, ovens and the like and which will positively prevent the possibility of burning the hands of the user.

Another object of the present invention is to construct the device of a pair of elongated handles positioned in parallelism and hingedly secured one to the other and to provide a pair of oppositely disposed specially constructed hook-shaped jaws and to rigidly fix one jaw in each handle, whereby the arms carrying the jaws are capable of being manipulated for engaging the flanges or ridges formed at the upper extremity of conventional pots and pans and to thereby facilitate the lifting of the same.

A further object of the present invention is the provision of a resilient means, preferably in the form of a suitable spring and to position the same between the two handles to thereby cause a resilient pressure to be applied from one handle against the other to facilitate the manipulating of the handles and gripping jaws thereon.

A still further object of the present invention is to provide a pan and pot lifter of the character described that is durable, simple in construction, positive in operation, economical to manufacture and highly efficient and serviceable in use.

Other objects and advantages will be apparent during the course of the following description.

In the accompanying drawing forming a part of the specification, wherein, for the purpose of illustration, like numerals designate like parts throughout the same, Fig. 1 is a plan view of the lifter with the oppositely opposed arms spread in their outermost position, Fig. 2 is a longitudinal side elevational view of the device, and Fig. 3 is a front end elevational view disclosing to advantage the hook portions of the arms in engagement with the flange of a conventional pan and in which position the arms are manipulated when it is desired to lift the pan.

Referring in detail to the drawing and the numerals thereof, the numerals 5 and 6 designate two handles, which handles are preferably formed with rounded front portions and with elongated square portions and are spaced in parallelism one from the other as disclosed to advantage in Fig. 1. The jaws are designated by numerals 7 and 8 and are preferably constructed of a stiff metal wire and have a substantially U-shaped configuration with the free ends extending in opposite sides of the handles 5 and 6, respectively, and are rigidly secured therein. The outer end portions of the jaws are formed hook-shaped as at 9 and 10 in Fig. 3 and are curved inwardly as at 11 in Fig. 2. The said handles are hingedly secured one to the other by suitable hinges 12 and 13 and a coil spring 14 is interposed between the said handles and is formed with straight end portions 15 that are secured in the handle 6 as disclosed to advantage in Fig. 1.

From the foregoing description taken in conjunction with the accompanying drawing, it will be apparent that the front round portions of the two hingedly secured handles 5 and 6 can be readily grasped by one hand and the two jaws quickly manipulated to the position shown in Fig. 2, and in which position the hook-shaped end portions of the jaws will engage the flange 16 of the pan 17 as illustrated in Fig. 3, whereby the pan can be easily lifted.

It is to be understood that the form of our invention herewith shown and described is to be taken as a preferred example of the same and that various changes relative to the shape, size, material and arrangement of parts may be resorted to without departing from the spirit of the invention or the scope of the subjoined claim.

Having thus described our invention, we claim:

In combination with a receptacle having an outwardly protruding flange thereon, a lifter of the character described embodying in its construction, a pair of elongated handle members spaced in parallelism one from the other, a portion of the handle members being formed with round hand holds and another portion being substantially of a square configuration, means hingedly securing the handle members one to the other, a coil spring secured to one of the handle members and longitudinally positioned between the two at the square portions thereof and in parallelism therewith to provide a resilient pressure against the same from one to the other, and a pair of oppositely disposed substantially U-shaped jaws fixed to the handle members and extending outwardly therefrom, the outer extremities of the jaws being formed with hook shaped portions for engaging the flange of the receptacle.

DELMER R. MERTON.
MARGUERITE MERTON.

REFERENCES CITED

The following references are of record in the file of this patent:

UNITED STATES PATENTS

| Number | Name | Date |
|---|---|---|
| 104,298 | Gibbs | June 14, 1870 |
| 1,509,265 | Shane | Sept. 23, 1924 |
| 1,514,825 | Benoist | Nov. 11, 1924 |
| 1,527,710 | Sibley | Feb. 24, 1925 |